May 28, 1935.  W. D. WILLIAMS  2,002,597
APPARATUS FOR MAKING CHEESE
Filed June 30, 1932
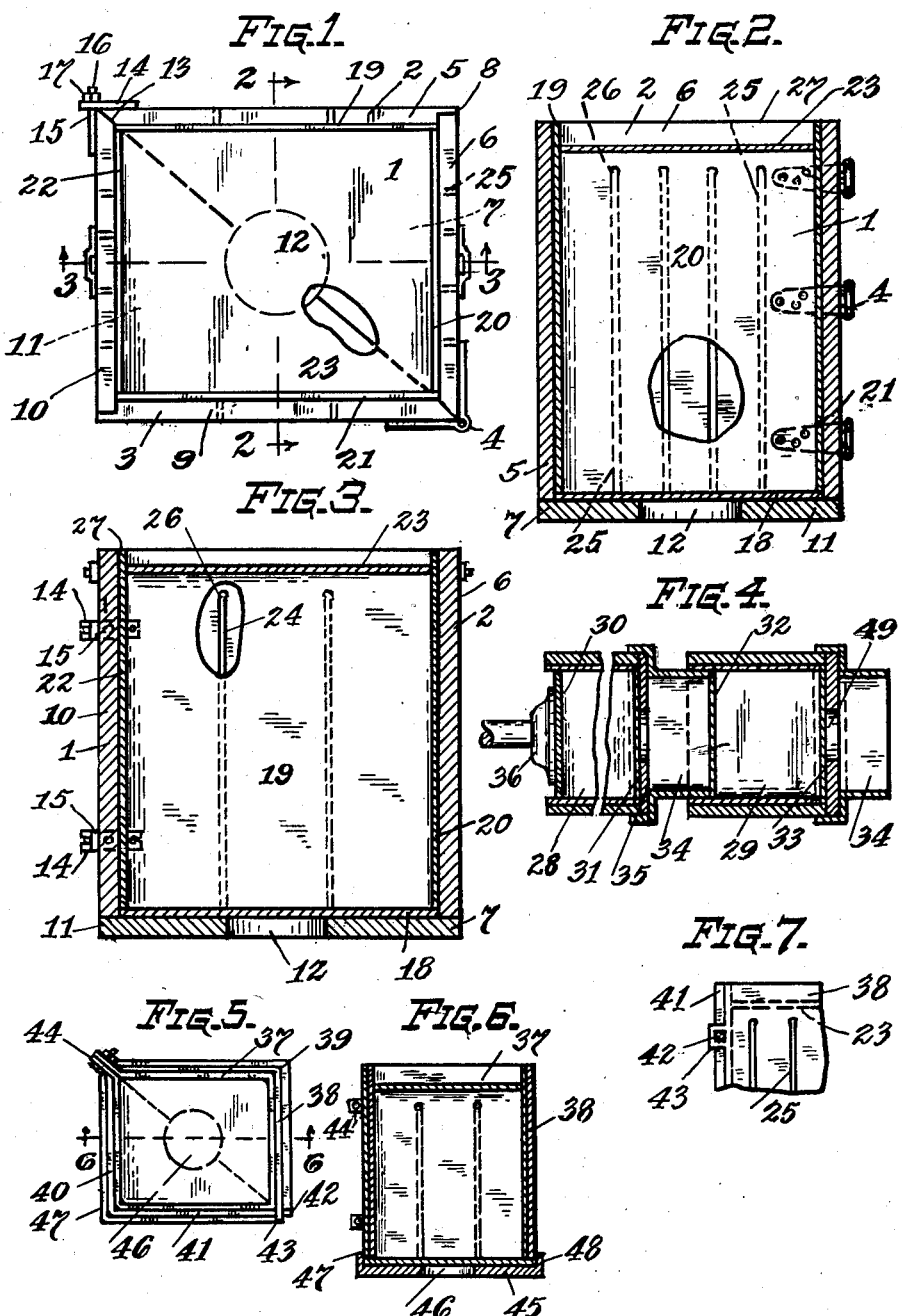
WILLIAM D. WILLIAMS,
BY Marks and Clerk
his Attorneys.

Patented May 28, 1935

2,002,597

UNITED STATES PATENT OFFICE 2,002,597

APPARATUS FOR MAKING CHEESE

William D. Williams, Atwood, Ontario, Canada

Application June 30, 1932, Serial No. 620,215
In Canada July 4, 1931

3 Claims. (Cl. 31—46)

The present invention relates to apparatus for making and preparing cheese for the market in suitable packages.

A large amount of wrapped and prepared cheese is placed on the market for retail purposes in one-half and one pound packages. They are usually made by pouring the cheese into small individual molds of the proper size, to make the usual one-half or one pound sizes. They are usually wrapped in cotton, and in tin foil or waxed paper. By the method used ordinarily, the surface of the cheese forms a rind and dries out, so that the cheese becomes unsaleable unless sold promptly. The drying out of the cheese, produces losses in the weight of the cheese after it is prepared for the market, and the cheese itself, often becomes harsh in taste and undesirable for this reason.

The present invention provides a means whereby the curd in making the cheese is suitably pressed or "matted" in a special container which forms part of the present invention; a convenient method is used for cutting the cheese into proper sizes without wastage of material; and also certain steps are followed in wrapping the cheese, which prevents drying out of the material, and the formation of rind.

My invention also saves the cotton ordinarily used in making the packages, labor in producing and handling the small one-half and one pound packages, and reduces mechanical losses over the previous methods in which individual molds are used, the material pressed separately in each mold, and the curd weighed, for each small cheese.

The instrumentalities used, and the steps followed in the preparation of cheese using the present method will be described as the specification proceeds herein.

In the drawing forming part of the present specification I have illustrated the devices used in carrying out of my method.

Figure 1 of the drawing is a plan view of a mold used for forming and pressing curd into cheese.

Figure 2 is a vertical section taken on line 2—2 of Fig. 1.

Figure 3 is a vertical section taken on line 3—3 of Fig. 1.

Figure 4 is a longitudinal section through a series of molds similar to that shown in Figure 1, with auxiliary devices used in pressing curd using a plurality of molds.

Figure 5 is a plan view of a metal mold.

Figure 6 is a vertical section taken on line 6—6 of Fig. 5.

Figure 7 is a detail in vertical elevation, of a slip joint used in connection with the side walls of the mold, such as that shown in Figure 5, taken from the right of Fig. 5.

Referring to the figures of the drawing, the Figures 1 to 3 inclusive show a type of mold, in which the numeral 1 indicates an open ended box-like structure, which is constructed in two halves 2, 3 which are hinged at 4 to each other at one corner of the mold. The part 2 comprises the two side walls 5, 6 and a bottom 7. The bottom plate 7 as illustrated in Fig. 1, extends only half way across the bottom of the mold, and is substantially triangular in form as shown. The side walls 5 and 6 are rigidly connected to each other at corner 8 of the mold, and are rigidly attached to the bottom plate 7 as well.

The other half of the mold 3 is substantially like the part 2, and is complementary thereto having the side walls 9 and 10 and the bottom plate 11. In the bottom of the mold there is an aperture 12, as clearly illustrated in Fig. 1, which is usually circular in form to admit the head of a pressure jack therethrough. The corner of the mold 13 is held in closed position by any suitable means such as that illustrated in Figs. 1 and 3 of the drawing, in which a slotted flat bar 14 is mounted on the part 2 of the mold, and a bolt-ended part 15 is mounted on the part 3 of the mold, the bolt end 16 passing through a slot in the bar 14 and secured by a nut 17 thereon.

Any convenient method may be used similar to that described for securely holding the two side walls 5 and 10 into close contact at point 14 without departure from the present invention. It will also be noted in this connection that instead of hinges at the corner 4 of the mold, a slip joint such as illustrated in Figs. 5 and 7 may be used instead of a hinge if found convenient.

Within the mold is placed a false bottom plate 18 preferably of metal stiff enough to resist pressure on the contents of the mold, when the head of a pressure jack is inserted through the aperture 12. There are within the mold four false plates 19, 20, 21, 22 preferably of thin metal such as tin, which are slidably removable from the mold when the corner 14 of the mold is opened somewhat. There is also a top metal plate 23 which is slidable within the false side plates 19 to 22 inclusive, and clearly shown in Fig. 3 of the drawing. The top plate 23 is made sufficiently strong to resist pressure on the contents of the mold without bending and is similar to the bottom plate 18.

It will be noted from Figs. 2 and 3 that the four side walls of the mold are perforated by vertical slots 24 and 25 through said side walls from a point 26 which is usually several inches from the top 27 of the mold, and extend downward to the top of the bottom plates 7 and 11. The purpose of these slots will be explained below.

In Fig. 4 are shown two molds 28, 29 which are laid on their sides in a horizontal position, and are provided with the top and bottom plates 30, 31, 32, 33 respectively. The molds 28 and 29 are joined in this instance by a metal open ended shell 34, the one end of which enters the mold 29 and engages against the plate 32 of said mold, and the opposite end of said shell encloses the bottom 35 of the mold 28. It is seen that any number of molds may be joined in this fashion using a series of metal shell separators 34, 34 etc. 36 represents the head of a pressure jack, which engages against the top plate 30 of the mold 28, and it is also seen that the head of a pressure jack may be inserted in the aperture 49 of the mold 29, and pressure exerted from both ends of the series of molds, and the curd which is placed in said molds may be simultaneously pressed or "matted" in each mold of the series.

In the Figs. 5 and 6 of the drawing is shown a modified type of mold which is made of metal but very similar to the type above described, which is made of wood. In these figures it will be noted that the side walls 37 and 38 are made integral, the corner 39 being merely bent into proper shape. Similarly the side walls 40, 41 are made from a single bent metal plate. The two plates 38 and 41 are shown joined at the corner by a slip joint in which an extension 42 of the plate 41 passes through an aperture made in an extension 43 of the plate 38. Two or more of these slip joints may be made in the vertical height of the plates 38 and 41 as readily understood. It is seen that this is an alternative means of securing the effect of a hinge joint at this particular corner of the mold.

The plates 37 and 40 may be bent in the form shown at the corner 44 of the mold and a bolt passed through the two extensions with a nut thereon forming a means of locking the said plates together at this corner of the mold. The bottom 45 of this type of mold is similar to the bottom of the first described mold having an aperture 46 therethrough but in this case the edges may be turned up at 47 and 48 around the bottom of the mold in order to rivet the bottom 45 to the side walls of the mold if necessary.

The procedure which I follow in making curd into cheese is as follows. Curd is placed in the mold to a proper height therein for the amount of cheese which it is desired to make at any particular pressing. The amount necessary to produce a certain number of pounds of cheese is found by experiment according to the particular size of mold being used.

A jack is inserted through the aperture 12 against the false bottom plate 18, and pressure brought to bear on the top plate 23 which causes the latter to be depressed, and coagulate the curd to the required point in the mold. It is understood during this part of the operation that the jack pressing on the plate 18 merely acts as an abutment while the plate 23 advances within the false sides 19, 20, 21, 22 of the mold.

When the curd has "matted" and the material stiffened to a proper degree, the corner of the mold 14 is opened slightly, enough to permit the removal of the plates 23 and 19 to 22 inclusive. A wire is next placed through the top of the slots 24, 25 etc. near the top of the mold and same is extended across the mold from the exterior of the walls 5 and 9 and 6 and 10, and is forced down through the cheese to the bottom plate 12. This cuts the cheese into proper vertical divisions in two directions. These sizes are of course made to correspond to the desired weights of cheese to be packaged. After the vertical cuts have been made either by a wire or knife inserted in the slots just described, the jack acting against the false bottom 18 is advanced upwardly and raises the contents of the mold to a certain height (which is 1⅞ inches in thickness usually for a one pound size of cheese) above the top of the mold. A wire is then pulled across the top of the mold horizontally cutting off a layer of finished cheese into the desired one-half or one pound sizes. It is seen that where the side walls of the mold are made of resilient material, that it may be unnecessary to have a hinge at the corner 4 of the mold as by opening the corner slightly at 14 the side walls may be sprung sufficiently to permit removal of the false side plates 19 to 22 inclusive.

Attention has been called in this specification as to the method followed in pressing the contents of a series of molds as shown in Fig. 4 of the drawing.

After the cutting operation into cheese of the desired weight, particularly one-half and one pound sizes ordinarily used in the trade, they are wrapped in tin foil of a proper size, and the tin foil is fused on to the sides of the cheese by passing it lightly over a heated surface on all sides of the cheese. This has the effect of causing the tin foil to adhere very closely to the cheese, and prevents rind from forming on the outer surfaces of the cheese, and also prevents the drying out of the cheese. The cheese may also be wrapped in waxed paper, or wax applied to the exterior of the cheese if desired. This method of preparing cheese reduces losses to the retailer, by eliminating the drying out of the cheese by air exposure, and obviates the necessity of cutting off rind which forms on the exterior surface of the cheese, by the retailer as unsaleable; and the cheese is also prevented from becoming undesirable and harsh to taste, because the tin foil is in such close proximity to the material that no deterioration can take place.

The advantages of this method are apparent in that a quantity of curd from thirty, to one hundred and five pounds approximately is weighed into a mold at one time for pressing and shaping into finished sizes, having a required weight. No cotton is used, and there are no mechanical losses in bandaging or dressing, no rind is formed on the cheese, and the labor is lessened in that a large number of cheeses are made and cut at a single operation, thereby eliminating much of the labor which has to be performed when individual molds are used for each one-half or one pound size of material.

I claim:—

1. In a mold for making cheese, an open-ended box-like mold comprising two similar parts, hingedly connected at one corner of the mold, and lockingly connected at the diagonally opposite corner of the mold, a pair of side walls on each part of the mold rigidly connected to each other, a rigidly mounted triangular bottom for one part of the mold having a recess therein, a second rigidly mounted triangular bottom for the other part of the mold having a recess therein, adapted to cooperate with the first-named recess, and form a single central opening in the base of the mold for admitting the head of a pressure jack therethrough, a removable false bottom plate, within the mold, a removable and slidably mounted side plate on each side of the interior of said mold, and a top plate adapted to slidably operate within the removable side plates for compressing curd used in making cheese, when pressure is applied to the top and false bottom plates of the mold.

2. In a mold for making cheese into predetermined small parcels as to size and weight, an open-ended box-like mold comprising two complementary parts, hingedly connected at one corner of the mold, and lockingly connected at a diagonally opposite corner of the mold, a side and an end wall rigidly connected together on each part of the mold; each pair of side and end walls respectively, having oppositely positioned vertical slots therein, adapted to receive a transverse horizontal wire therethrough, for cutting the cheese into vertical masses of proper size, a triangular bottom for one half of the mold, mounted on the side walls thereof, and having a recess therein, a second triangular bottom for the other half of the mold, having a recess therein, adapted to co-operate with the first named recess, and form a single central opening in the base of the mold for receiving the head of a pressure jack, a removable false bottom plate within the mold, a plurality of removable side plates slidably mounted within the mold, each in proximity to one of the sides of the mold, and a top plate adapted to slidably operate within the removable side plates, for the purpose of compressing the curd used to make the cheese, when pressure is applied to the said top plate of the mold.

3. In the means for pressing curd into cheese, a number of box-like open-ended molds in alignment with each other, a slidable top plate in each mold, a hollow metal shell between each pair of molds, each having a flanged recess at one end adapted to receive the bottom end of a mold, and an extension of reduced size adapted to enter the open end of an adjacent mold and engage against the slidable top plate of said mold in order to compress the contents thereof when pressure is exerted on the contents of the end molds of the series.

WILLIAM D. WILLIAMS.